United States Patent
Ganda et al.

(10) Patent No.: US 9,934,135 B2
(45) Date of Patent: Apr. 3, 2018

(54) GENERIC TEST AUTOMATION FOR APPLICATION PROGRAMMING INTERFACE APPLICATIONS

(71) Applicant: CA, Inc., New York, NY (US)

(72) Inventors: Madhusudhan Ganda, Kadapa (IN); Vikrant Nandakumar, Bangalore (IN); Tapan Sahoo, Bangalore (IN)

(73) Assignee: CA, Inc., Islandia, NY (US)

( * ) Notice: Subject to any disclaimer, the term of this patent is extended or adjusted under 35 U.S.C. 154(b) by 45 days.

(21) Appl. No.: 14/825,312

(22) Filed: Aug. 13, 2015

(65) Prior Publication Data

US 2017/0046253 A1 Feb. 16, 2017

(51) Int. Cl.
*G06F 9/44* (2006.01)
*G06F 11/36* (2006.01)
*H04L 12/24* (2006.01)
*H04L 29/08* (2006.01)
*H04L 29/06* (2006.01)

(52) U.S. Cl.
CPC ...... *G06F 11/3688* (2013.01); *G06F 11/3684* (2013.01); *G06F 11/3692* (2013.01); *G06F 11/36* (2013.01); *G06F 11/3612* (2013.01); *G06F 11/3664* (2013.01); *H04L 29/08981* (2013.01); *H04L 41/22* (2013.01); *H04L 63/0823* (2013.01)

(58) Field of Classification Search
CPC .......... G06F 11/3664; G06F 11/3604; G06F 11/3668; G06F 11/3612; G06F 11/36; H04L 41/22; H04L 63/0823; H04L 29/08981
See application file for complete search history.

(56) References Cited

U.S. PATENT DOCUMENTS

| | | | | |
|---|---|---|---|---|
| 8,745,641 | B1* | 6/2014 | Coker | G06F 11/3668 719/313 |
| 2005/0263592 | A1* | 12/2005 | Berger | G06Q 10/087 235/385 |
| 2008/0028474 | A1* | 1/2008 | Horne | G06F 11/3604 726/27 |
| 2009/0178022 | A1* | 7/2009 | Horne | G06F 11/3604 717/140 |

(Continued)

OTHER PUBLICATIONS

Evan Martin, Automated Test Generation for Access Control Policies, ACM, Oct. 2006, retrieved online on Nov. 30, 2017, pp. 752-753. Retrieved from the Internet: <URL: http://delivery.acm.org/10.1145/1180000/1176708/p752-martin.pdf?>.*

(Continued)

*Primary Examiner* — Hanh T Bui
(74) *Attorney, Agent, or Firm* — Stevens & Showalter, LLP

(57) ABSTRACT

A method for testing an application that invokes an application programming interface (API) comprises identifying signatures for APIs. A package associated with the API is identified in the application under test, and a package name of the API is identified in the signatures. During runtime of the application under test, request and response objects (or other objects) for the identified package are created using the package name and reflection. The created request object is then used to invoke the API to test the application under test and the response object is used to evaluate the response with expected response.

14 Claims, 8 Drawing Sheets

(56) References Cited

U.S. PATENT DOCUMENTS

| | | | | |
|---|---|---|---|---|
| 2011/0145402 | A1* | 6/2011 | Thangadurai | G06F 11/3414 709/224 |
| 2011/0283148 | A1* | 11/2011 | Rossi | G06F 11/3684 714/38.1 |
| 2012/0136603 | A1* | 5/2012 | Ishikawa | H04L 41/22 702/85 |
| 2014/0331297 | A1* | 11/2014 | Innes | H04L 63/08 726/7 |
| 2015/0200782 | A1* | 7/2015 | Horne | G06F 11/3604 713/189 |
| 2017/0300670 | A1* | 10/2017 | Horne | G06F 11/3604 |

OTHER PUBLICATIONS

Vladimir Belorusets, Rest API Test Automation in Java with Open Source Tools, 2015, Software Development magazine, retrieved online on Nov. 30, 2017, pp. 1-8. Retrieved from the Internet: <URL: http://www.methodsandtools.com/archive/restapitesting.php>.*

Smartbear. Printed Jul. 23, 2015. "Software Automated, Functional, Performance Testing Tools". http://smartbear.com/products/testing. 4 pages.

CA Service Virtualization. Printed Jul. 23, 2015. "CA Service Virtualization—Verification and Validation Testing". http://www.ca.com/us/devcenter/ca-service-virtualization.aspx. 3 pages.

* cited by examiner

| # Package Name | ReturnType methodName and arguments |
|---|---|
| Info window | int open (arg 1, arg 2) |
| GoogleAccountCredential | android.accounts.Account[ ] getAllAccounts ( ) |
| GoogleAccountCredential | set SelectedAccountName (String accountName) |

FIG. 5

| # Package Name | ReturnType methodName and arguments |
|---|---|
| Risk X Action API | initialize (java.util.Map initproperty) |
| Com.arcot.riskfortAPI.RiskAssessment | evaluateRisk (java.lang.string callerID, com.arcot.riskfortAPI.UserContext userContext) |
| Com.arcot.riskfortAPI.PostEvaluateResponse | postEvaluate (java.lang.string callerID, com.arcot.riskfortAPI.RiskAssessment RiskAssessment) |

FIG. 6

| Test Step | Test Steps/Test Operations | EXPECTED_OUTPUT |
|---|---|---|
| 1 | Initialize | \<RiskXActionAPI\><br>\<check\>NOTNULL\</check\><br>\<check\>NOTEMPTY\</check\><br>\</RiskXActionAPI\> |
| 2 | evaluateRisk | \<evaluateRisk\><br>\<callerid\>$[deviceID]\</callerid\><br>\<userContext\><br>\<orgName\>ORG1\</orgName\><br>\<userName\>UNKNOWNUSER\</userName\><br>\</userContext\><br>\</evaluateRisk\> |
| 3 | postEvaluateRisk | \<PostEvaluateResponse\><br>\<isAllowAdvised\>false\</isAllowAdvised\><br>\<riskFortSuccess\><br>\<successMessage\>SUCCESS\</successMessage\><br>\<transactionID\> 1:1234\</transactionID\><br>\</riskFortSuccess\><br>\</PostEvaluateResponse\> |

FIG. 7

GENERIC TEST AUTOMATION FOR APPLICATION PROGRAMMING INTERFACE APPLICATIONS

BACKGROUND

Various aspects of the present disclosure relate generally to testing applications and specifically to automated testing of applications using application programming interfaces (APIs). Therefore, the present disclosure advances an improvement in the technical field of application development and testing.

Software applications require extensive testing before being released to the general public to ensure proper functionality. In modern computing systems, many web and mobile software applications interact with exposed application programming interfaces (APIs) of various websites. To access the API of a specific website (e.g., Google Maps, PayPal, etc.), a developer requests a certificate from the website. Google is a registered trademark of Google Inc. a Delaware corporation, located at 1600 Amphitheatre Parkway, Mountain View, Calif. 94043. PayPal is a registered trademark of PayPal, Inc., a Delaware corporation, located at 2211 North First Street, San Jose, Calif. 95131.

Then, a signature for the exposed API is created using the certificate. Before testing the application, the user must create a request and response objects for the exposed API. During testing, the request object is invoked in a software automation tool. If no exceptions occur, then a verification manager determines whether the test was successful or not and reports either success or an error. Through extensive testing, software developers may ensure a more robust release of the application under test.

BRIEF SUMMARY

According to aspects of the present disclosure, a method for testing an application that invokes an application programming interface (API) comprises identifying signatures for APIs. A package associated with the API is identified in the application under test, and a package name of the API is identified in the signatures. During runtime of the application under test, request and response objects for the identified package are created using the package name and reflection. The created request object is then used to invoke the API to test the application under test and the response object is used to evaluate the response with expected response.

BRIEF DESCRIPTION OF THE SEVERAL VIEWS OF THE DRAWINGS

FIG. 5 is a table illustrating a sample API signature for Google maps;

FIG. 6 is a chart table example API signatures for a risk-based test of an application, according to various aspects of the present disclosure;

FIG. 7 is a table illustrating example test data for creating request and response objects, according to various aspects of the present disclosure.

DETAILED DESCRIPTION

According to various aspects of the present disclosure, a request object for an application programming interface (API) is created automatically during runtime of an application under test in a test automation tool. Basically, signatures for APIs invoked by the application under test are stored in a property file, and during testing, a generic request object has variable parameters populated with values from the property file via reflection. The request object may then be used to invoke the API.

Also, a response object for an application programming interface (API) is created automatically during runtime of an application under test in a test automation tool. Basically, signatures for APIs invoked by the application under test are stored in a property file, and during testing, a generic response object has variable parameters populated as part of the actual response of the API. The response object may then be used to verify that the application under test is functioning properly.

By automatically creating the request object and the response object at runtime using generic objects, a developer does not need to create the objects manually (either via code or via a graphical user interface). Further, the creation of the objects at runtime allows the generic objects to be used with any application, any API, and any automation tool.

Figure 1:
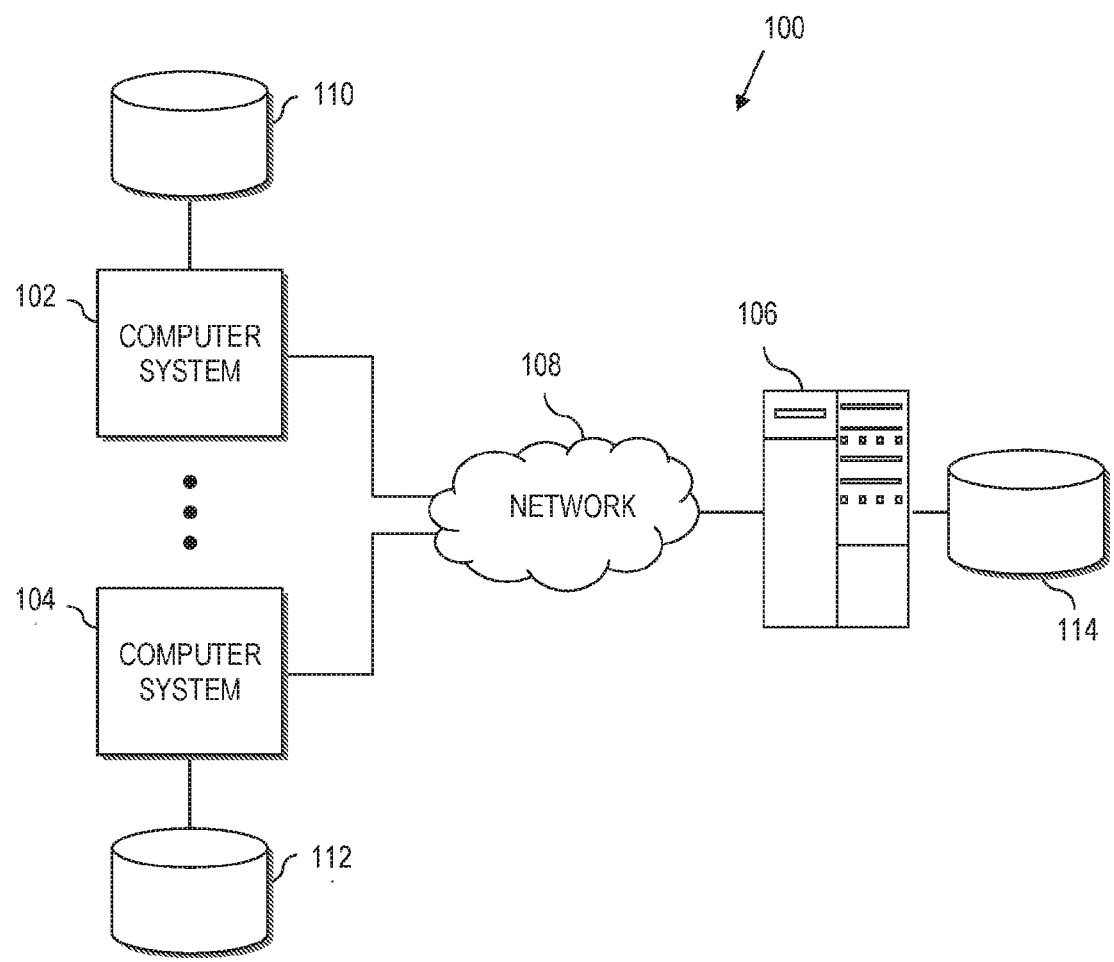
FIG. 1 is a block diagram of a networked system, according to various aspects of the present disclosure.

Referring to drawings and in particular FIG. 1, a network system 100 is illustrated according to aspects of the present disclosure herein. Generally, a processing device designated as a first machine 102 communicates with one or more remote processing devices, e.g., a second machine 104 and a third machine 106, across a network 108. The second machine 104 and third machine 106 are illustrated solely for purposes of simplified explanation. In practice, one or more remote devices may communicate with the first machine 102. The first machine 102 may comprise a mainframe computer, server computer, or other processing device that is capable of responding to data transfer requests, as will be described in greater detail herein. In this regard, the first machine 102 has access to storage 110, e.g., any form of storage, including disk(s), network addressed storage (NAS), file server(s), a cloud based storage or other structure where data can be retrieved.

The second machine 104 and third machine 106 may each comprise any processing device that is capable of communicating over the network 108 to request and/or receive data from the first machine 102. For instance, typical processing devices include server computers, personal computers, notebook computers, and tablets. The second machine 104 or third machine 106 may also comprise by way of example, transactional systems, purpose-driven appliances, cellular devices including smart telephones, and special purpose computing devices.

For purposes of discussion herein, the second machine 104 has access to storage 112 where data received from the first machine 102 is to be stored. Likewise, the third machine 106 has access to storage 114 where data received from the first machine 102 is to be stored.

The network 108 provides communication links between the various processing devices, e.g., the first machine 102, the second machine 104, and the third machine 106. Accordingly, the network 108 may be supported by networking components such as routers, switches, hubs, firewalls, network interfaces, wired or wireless communication links and corresponding interconnections, cellular stations and corresponding cellular conversion technologies, e.g., to convert between cellular and TCP/IP, etc. Such devices are not shown for purposes of clarity. Moreover, the network 108 may comprise connections using one or more intranets, extranets, local area networks (LAN), wide area networks (WAN), wireless networks (WIFI), the Internet, including the world wide web, a cloud, and/or other arrangements for enabling communication between the processing devices, in either real time or otherwise, e.g., via time shifting, batch processing, etc.

The network system 100 is shown by way of illustration, and not by way of limitation, as a computing environment in which various aspects of the present disclosure may be practiced. Other configurations may alternatively be implemented. All of the devices discussed above in reference to the network (e.g., machines, routers, switches, hubs, etc.) are entities within the network.

One of the machines 102, 104, 106 may include an exposed API that an application under test may utilize. For example, the third machine 106 may include an exposed API for Google maps. An application running on the first machine 102 may wish to access Google maps to provide a location of a local pharmacy. Therefore, a developer of the application must request a certificate from Google maps and create a signature for the exposed Google maps API based on the certificate.

Figure 2:
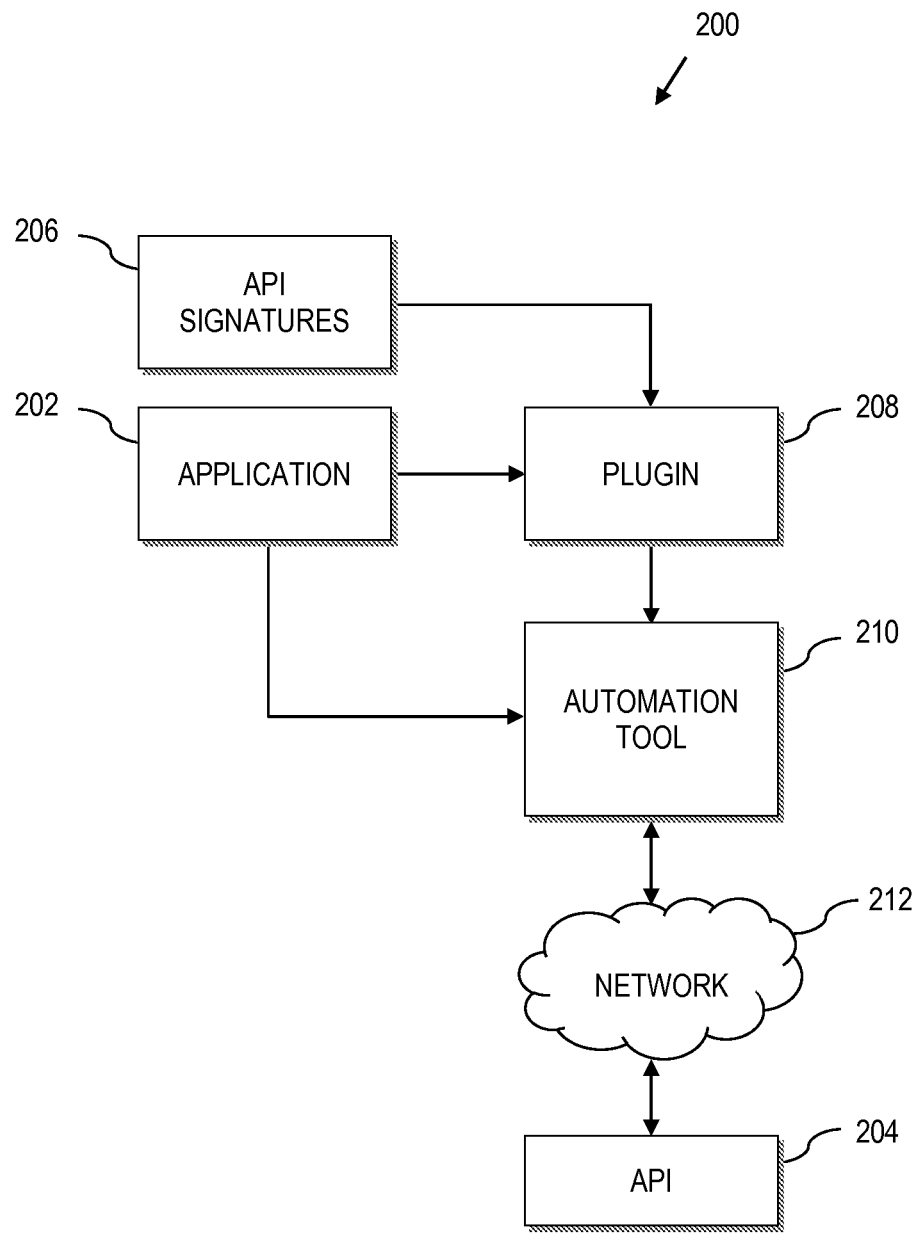
FIG. 2 is a block diagram of a test automation environment, according to various aspects of the present disclosure.

FIG. 2 illustrates a system 200 for testing an application 202 that uses an exposed API 204 from a server running a web application (e.g., Google maps, PayPal, Amazon, etc.). Amazon is a registered trademark of Amazon Technologies, Inc., a Nevada corporation, P.O. Box 8102, Reno, Nev. 89507.

As mentioned above, when testing an API interface of an application 202, the developer of the application 202 requests a certificate from the API 204 and creates a signature for the API 204 and stores the API signature in a property file of API signatures 206. The property file may be created manually (e.g., written by a developer) or automatically (e.g., generated from a JAR file of the application). Further, it is possible that there is no certificate required to create a signature for an exposed API. In such a case, then the signature may be created independently of a certificate. The property file 206 may be separate from the application 202 or may be part of the application itself. Further, the property file 206 may include any number of API signatures and may be one integral file (i.e., all the API signatures concatenated in one file) or may be disparate (i.e., the property file may be broken up into more than one file).

During runtime of the test of the application, an API translator plugin 208 coupled to an automation tool 210 reads the property file 206 to get a signature for the exposed API 204. The signature includes a package name, a method name, exceptions, and parameters associated with the API 204. If the package name found in the signature is present in the application 202, then the automation tool 210 creates a request object to invoke the API 204 over a network 212.

If the signature includes an expected response, then the plugin 208 may create a response object that is used to verify that the application is working correctly.

Figure 3:
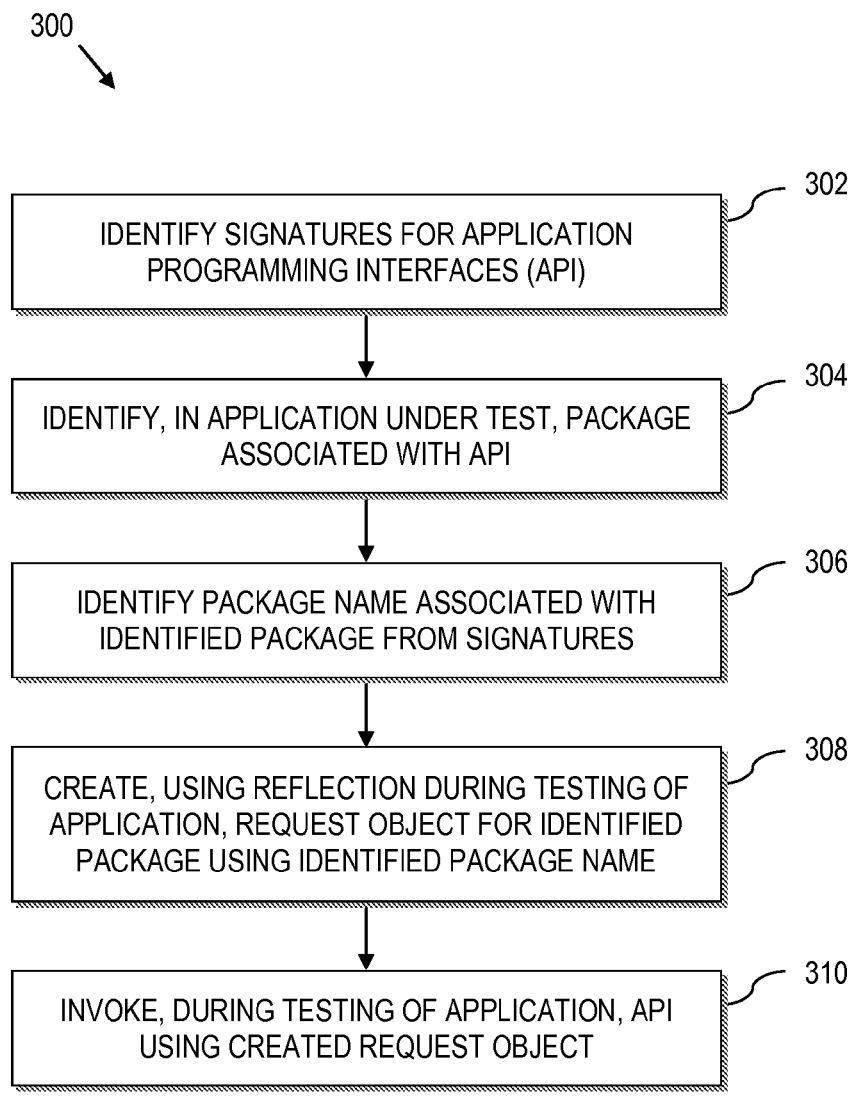
FIG. 3 is a flow chart illustrating a method for testing applications using application programming interfaces, according to various aspects of the present disclosure.

Referring now to FIG. 3, a method 300 for testing an application that uses an exposed API is presented. In this regard, the method 300 may be implemented on computer-readable hardware that stores machine-executable program code, where the program code instructs a processor to implement the described method. The method 300 may also be executed by a processor coupled to memory, where the processor is programmed by program code stored in the memory, to perform the described method.

At 302, signatures for an exposed API are identified. For example, signatures may be kept in a property file, where each signature includes a package name, a method name, and parameters associated with a corresponding API. For example, if an application requires access to Google maps, PayPal, and Amazon, then the property file may include three signatures (i.e., one signature for each API used by the application). As mentioned above, the property file may be one file or may be broken into more than one file.

At 304, a package associated with the API is found in an application under test. Further, at 306, a package name of the API signature is identified. For example, the package name may be found by parsing an application under test for a call to an exposed API; then a signature associated with that exposed API is located within the property file. On the other hand, a package name may be identified from a selected signature in the property file, and then that package is found within the application under test. In other words, 304 and 306 may be performed in any order, not limited to the order shown in FIG. 3.

At 308, a request object for the identified package is created using reflection during testing of the application under test. For example, a generic request object may include variable parameters that are filled in at runtime using test data supplied by the developer. As such, an API translator plugin may read the generic request object and reflection may be used to get definite values from the identified signature for the variable parameters within the generic request object.

At 310, the request object is used to invoke the exposed API. For example, the request object may be used to directly invoke the API. Alternatively, the request object may be sent to an automation tool that uses the request object to invoke the API.

Further, every time a request object is created, a counter may be incremented, and the count of the counter may be displayed at end of testing to indicate whether all of the packages in the application have been tested or to determine that the test ran properly. For example, if at the end of the test, the counter reads zero, then that may indicate a red flag that there are missing test cases for specific signatures. As another example, if at the end of the test, the counter reads a higher number for any signatures, then it may be a red flag indicating that the specific signatures may be overly tested and test cases may need to be optimized for a faster test execution. Other red flags may be raised if there is no variety in test data for the parameters present in signature. For example, API may contain optional parameters and the identified test data might not have any data for optional parameters.

Further, as discussed above, the steps of the method 300 do not have to be executed in the order presented in the flow chart of FIG. 3. For example, instead of invoking the API using the request object before all of the request objects are created, the method 300 may create all of the request objects before any of the APIs are invoked, or the request objects (after the first request object) may be created while the first request object is used to invoke the API.

The method 300 shown above may be used to automatically create a request object during runtime of an application under test. For example, a developer does not have to manually write code creating the request object. Thus, the developer does not write any code specific to any package or specific to any application. As another example, the developer does not need to use a graphical user interface of a test automation tool to create the request object. Thus, the method 300 above may be used with any test automation tool. For example, the developer may test the application in a first test automation tool. Then the developer may test the application in a second test automation tool without needing to rewrite any test code.

Figure 4:
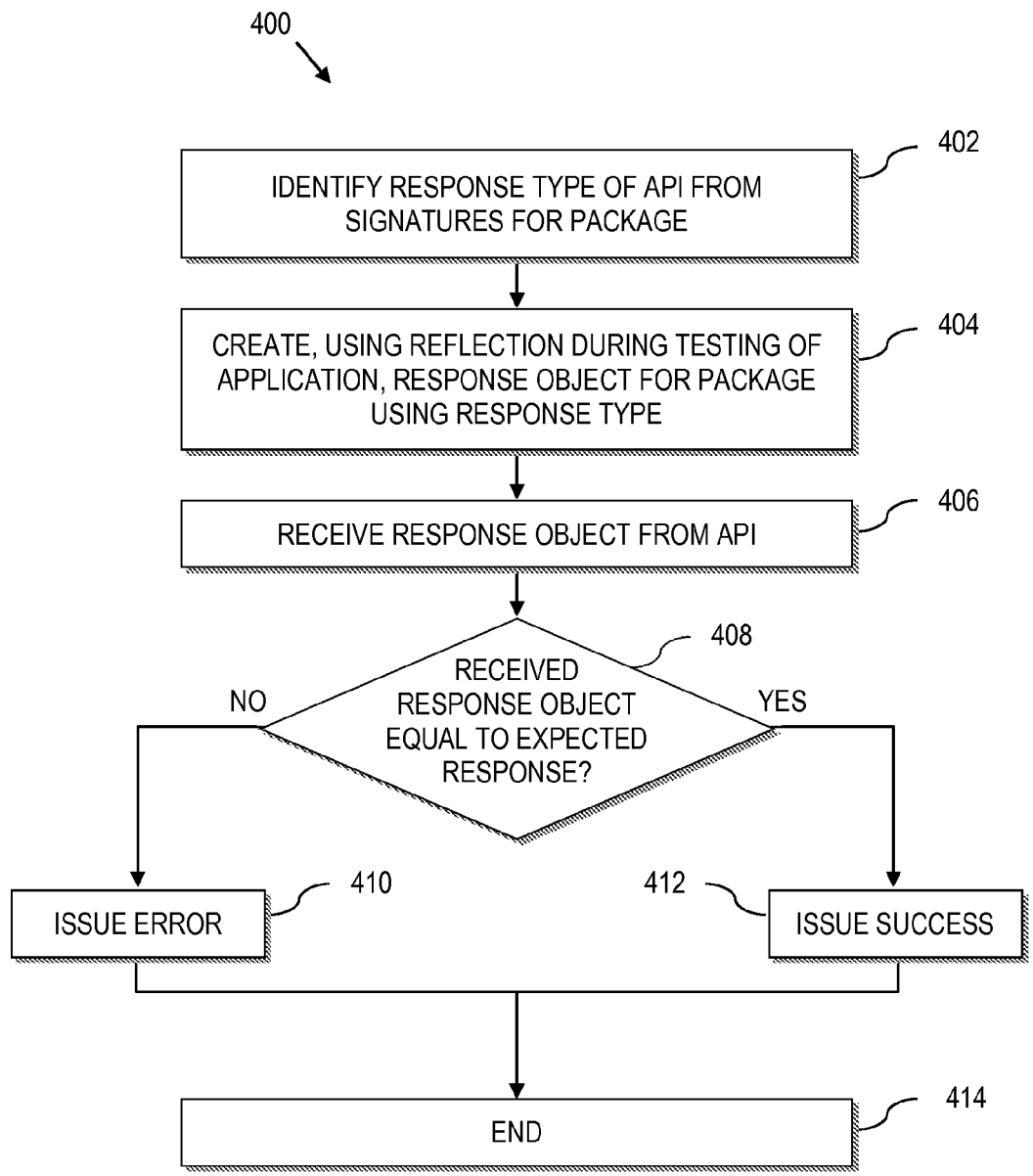
FIG. 4 is a flow chart illustrating a method for verifying applications using application programming interfaces, according to various aspects of the present disclosure.

FIG. 4 illustrates a method 400 for verifying an application under test that uses an exposed API. In this regard, the method 400 may be implemented on computer-readable hardware that stores machine-executable program code, where the program code instructs a processor to implement the described method. The method 400 may also be executed by a processor coupled to memory, where the processor is programmed by program code stored in the memory, to perform the described method. The application under test may be any application that uses an exposed API and may have used the method 300 of FIG. 3 to generate the request object. However, it is not required that the request object was created via the method 300 of FIG. 3.

At 402, a response type is determined from a signature of an API. For example, signatures may be kept in a property file, where each signature includes a package name, a method name, and parameters (which include a response name, which may be an expected response from the API) associated with a corresponding API. For example, if an application requires access to Google maps, PayPal, and Amazon, then the property file may include three signatures (i.e., one signature for each API used by the application). As mentioned above, the property file may be one file or may be broken into more than one file.

At 404, a response object for the identified response name is created using reflection during testing of the application under test. For example, a generic response object may include variable parameters that are filled in at runtime. As such, an API translator plugin may read the generic response object and use reflection to get definite values from the identified signature for the variable parameters within the generic response object.

At 406, a response is received from the API, and at 408, the received response is compared to the created response object (i.e., an expected response). If the received response does not match the expected response object, then an error is issued at 410. On the other hand, if the received response matches the expected response, then a success message is issued at 412.

At 414, if there are no more test operations in the test cases, then the operation ends.

As with the creation of the request objects above, every time a request object is created, a counter may be incremented, and the count of the counter may be displayed at end of testing to indicate whether all of the packages in the application have been tested or to determine that the test ran properly. For example, if at the end of the test, the signature counter reads zero, then that may indicate a red flag that there are missing test cases for specific signatures. As another example, if at the end of the test, the counter reads a higher number for any signatures, then it may be a red flag indicating that those specific signatures may be overly tested and test cases may need to be optimized for a faster test execution. Other red flags may be raised if there is no variety in test data for the parameters present in signature. For example, API may contain optional parameters and the identified test data might not have any data for optional parameters. As discussed in above examples, the counters can be specific to API invocation, parameter specific, response value specific, Package specific, etc. in order to raise meaningful red flags.

Similar to the method 300 of FIG. 3, the steps of the method 400 do not have to be executed in the order presented in the flow chart of FIG. 4. For example, instead of comparing the response object to the received object before all of the response objects are created, the method 400 may create the response objects before any of the response objects are used in a comparison with a received response, or the response objects (after the first response object) may be created while the first response object is used to compare with a received response.

If the method 300 of FIG. 3 is used to create the request object and the method 400 of FIG. 4 is used to create the response object, then both the request object and the response object for one package may be created concurrently. In other words, the package name and response type may be identified for a selected package; then the request and response objects may be created. Then, the methods 300, 400 may loop back to identify another package for object creation.

Further, the creation of objects according to FIGS. 3-4 may be used to create other objects listed in the API signature. For example, if the API signature includes exceptions that may be thrown in the case of an error, then an exception object may be created in a similar fashion.

Sample code for creating a request object and a response object is shown below:

```
try {
    ...
    objectR = (Operation) (Class.forName(objectType) .newInstance( 
));
    ...
} catch(Exception e) {
    logger.fatal ("Exception occurred: " , e);
    //e.printStackTrace( );
    throw new RuntimeException("Could not instantiate the
    object for" +
        objectType);
}
//if no exception, then invoke API with request object
Method method = objectR.getClass( ) .getMethod(testoperation,
            new Class[ ] { params });
ObjectResponse = method.invoke(objectR, new Object[ ] { params }};
//Compare objectResonse with expected output for testoperation
    ...
```

FIGS. 5-6 illustrate examples of application-specific API signatures for Google maps and a risk-based application respectively. Both API signatures shown include a package name and methods and arguments for the package. For example, using FIG. 5, a package named InfoWindow has a returnType of int, a method name of open, and two arguments (i.e., arg1 and arg2). Therefore, during testing, the automation tool will read the signature and create a request object for InfoWindow that includes a method of open with two arguments that are populated from test data. Further, a response object may be created in a similar manner.

Using the risk-based API signature of FIG. 6, another example is provided. Along with the API signature of FIG. 6, the developer has also created application-specific test cases, as shown in FIG. 7. Further, the developer has created application-specific test data for the test cases as shown below:

```
<initialize>
    <initproperty>
        <hostName>134.13.24.9</hostName>
        <port>8943</port>
    </initproperty>
</initialize>
<evaluateRisk>
    <callerId>${deviceID}</callerId>
    <userContext>
        <orgName>ORG1</orgName>
        <userName>USER2</userName>
    </userContext>
</evaluateRisk>
<postEvaluate>
    <callerId>${deviceID}</callerId>
    <riskAssessment>${riskAssessment}</riskAssessment>
</postEvaluate>
```

The test case and test data are read in by a test driver and sent to the translator plugin which looks for the list of API signatures. Then the request object and response objects are created from the test data using reflection. Before invoking the API with requested object, test driver reads the test data for the required parameters of the API and then invokes the API. A response from the API is captured in the response object. Then the test driver will evaluate the application response and the expected response of the corresponding test step in test scenario.

When the developer is testing the risk application (that interacts with the API of the signature of FIG. 6), the automation tool identifies that API signatures associated with the application are stored in a property file (i.e., FIG. 6). The test case (which is read in by a test driver) includes an operation to initialize, so the automation tool performs the action using the application and determines that the application includes a call to Risk X Action API. From the signature in the property file, the package is to be invoked using an initialize method with an argument (i.e., initproperty of response type java.util.Map). A request object is then created using the initialize method, and values from the test data are substituted into the variable arguments. In this case, the initproperty argument includes two different values of a hostName and a port: 134.13.24.9 and 8943, respectively. Then the created request object is used to invoke the API.

Further, a response object is created in a similar fashion. For the initialize operation, the response object is just a check to determine that the response is not null and not empty. When the API returns a response, the response is compared to the response object and success or failure is indicated based on the comparison. A signature counter may be incremented to indicate that a request object and a response object were created.

The second step in the test case includes an evaluateRisk method. A request object is created with a method of evaluateRisk with arguments. The values for the callerID and userContext are supplied using reflection and the test data, so the callerID is $[deviceID] (which is automatically detected at runtime from the device that has requested the operation) and the userContext includes an orgName of ORG1 and a username of USER2. These values are plugged in to create a request object. Further, a response object is created with values similar to the request object, except that the username is UNKNOWNUSER instead of USER2. However, USER2 is an unknown user to the Application under test, so the response from the API includes an UNKNOWNUSER for the userName. Therefore, when the received response is compared to the response object, everything matches, and the test was successful. The signature counter may also be incremented.

The third step in the test case is read in by the test driver and fed the operation to the test automation tool. The request object is created using the test data. In this case the value ${riskAssessment} is populated with an output from step 2 (i.e., the com.arcot.riskfortAPI.riskAssessment step, which included the evaluateRisk method). The request object is used to invoke the API, and a response is received. Again, a response object is created (before, after, or during creation of the request object) and compared to the received response. If the expected response matches the received response, then the test was successful. The signature counter may be incremented and displayed to a user indicating that three packages were tested.

Figure 8:
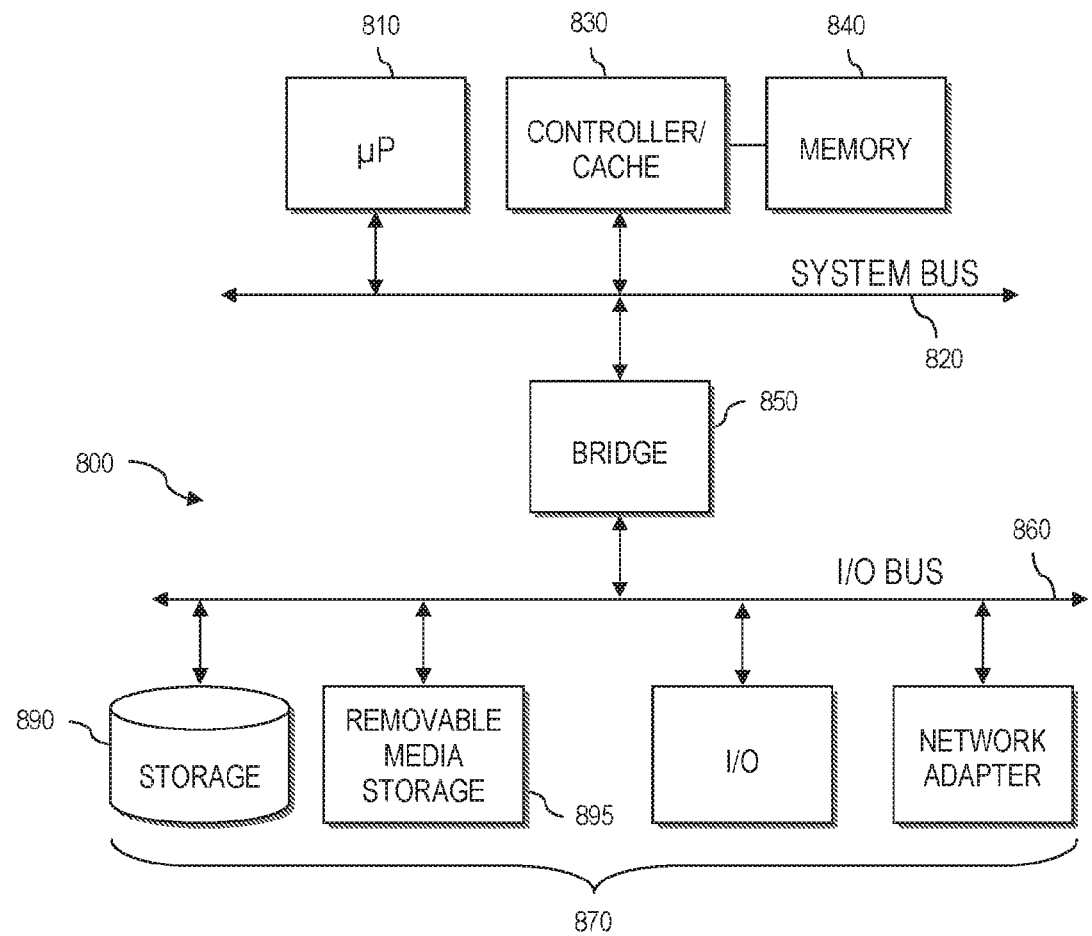
FIG. 8 is a block diagram of a computer system having a computer readable storage medium for implementing functions according to various aspects of the present invention as described in greater detail herein.

Referring to FIG. 8, a block diagram of a data processing system is depicted in accordance with the present invention. Data processing system 800 may comprise a symmetric multiprocessor (SMP) system or other configuration including a plurality of processors 810 connected to system bus 820. Alternatively, a single processor 810 may be employed. Also connected to system bus 820 is memory controller/cache 830, which provides an interface to local memory 840. An I/O bus bridge 850 is connected to the system bus 820 and provides an interface to an I/O bus 860. The I/O bus may be utilized to support one or more buses and corresponding devices 870, such as bus bridges, input output devices (I/O devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 880, storage 890 and a computer usable storage medium 895 having computer usable program code embodied thereon. The computer usable program code may be executed to implement any aspect of the present invention, for example, to implement any aspect of any of the methods and/or system components illustrated in FIGS. 1-7.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable storage medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer storage medium does not include propagating signals.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Network using a Network Service Provider).

Aspects of the present disclosure are described herein with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the invention in the form disclosed. Many modifications and variations will be apparent to those of ordinary skill in the art without departing from the scope and spirit of the invention. Aspects of the disclosure were chosen and described in order to best explain the principles of the invention and the practical application, and to enable others of ordinary skill in the art to understand the invention for various embodiments with various modifications as are suited to the particular use contemplated.

What is claimed is:

1. A method comprising:
   receiving certificates from an application programming interface (API);
   creating signatures for the API based on the received certificates from the API;
   creating a property file including the signatures for the API;
   identifying, in an application under test, a package associated with the API;
   identifying, from the signatures included in the property file, a package name of the package identified package associated with the API;

creating, using reflection during testing of the application under test, a request object for the identified package using the package name and further using data from a response from a previous request to the API to populate a value of a variable of the request object;

invoking, during testing of the application under test, the API using the request object;

identifying a response type of the API from the signatures;

creating, using reflection during testing of the application under test, an expected response object for the identified package using the response type, the package name, a response name, and parameter names from the signature associated with the identified package, wherein the expected response object includes an expected response;

receiving an API response object from the API;

comparing the API response object from the API to the expected response to determine whether the API response object from the API is correct; and issuing an error response if the API response object from the API is not correct.

2. The method of claim 1, wherein creating, using reflection during testing of the application under test, a request object for the identified package using the package name further comprises using the package name, a method name, and parameter names from the signature associated with the identified package to dynamically create the request object.

3. The method of claim 1, wherein:

identifying a package name of the API from the signatures further comprises selecting the identified package name;

identifying, in an application under test, a package associated with an API further comprises identifying, in the application under test, a package associated with the selected package name; and creating, using reflection during testing of the application under test, a request object for the identified package using the package name further comprises creating, using reflection during testing of the application under test, a request object based on the identified package associated with the selected package name.

4. The method of claim 3 further comprising repeating the method until each package name of the signatures has been selected.

5. The method of claim 1 further comprising:

incrementing a count of a counter whenever the request object is created; and sending the count for display.

6. The method of claim 5, wherein sending the count for display further includes sending an indication that not all of the packages within the application under test have been tested if the count of the counter is less than the number of packages in the application under test.

7. A system comprising a hardware processor coupled to memory, wherein the processor is programmed to test an application by:

receiving certificates from an application programming interface (API);

creating signatures for the API based on the received certificates from the API;

creating a property file including the signatures for the API;

identifying, in an application under test, a package associated with the API;

identifying, from the signatures included in the property file, a package name of the package identified package associated with the API;

creating, using reflection during testing of the application under test, a request object for the identified package using the package name and further using data from a response from a previous request to the API to populate a value of a variable of the request object;

invoking, during testing of the application under test, the API using the request object;

identifying a response type of the API from the signatures;

creating, using reflection during testing of the application under test, an expected response object for the identified package using the response type, the package name, a response name, and parameter names from the signature associated with the identified package, wherein the expected response object includes an expected response;

receiving an API response object from the API;

comparing the API response object from the API to the expected response to determine whether the API response object from the API is correct; and issuing an error response if the API response object from the API is not correct.

8. The system of claim 7, wherein creating, using reflection during testing of the application under test, a request object for the identified package using the package name further comprises using the package name, a method name, and parameter names from the signature associated with the identified package to dynamically create the request object.

9. The method of claim 7 further comprising:

incrementing a count of a counter whenever expected response object is created; and sending the count for display.

10. The method of claim 9, wherein sending the count for display further includes sending an indication that not all of the packages within the application under test have been tested if the count of the counter is lower than the number of packages in the application under test.

11. The system of claim 7, wherein:

identifying a package name of the API from the signatures further comprises selecting the identified package name;

identifying, in an application under test, a package associated with an API further comprises identifying, in the application under test, a package associated with the selected package name; and creating, using reflection during testing of the application under test, a request object for the identified package using the package name further comprises creating, using reflection during testing of the application under test, a request object based on the identified package associated with the selected package name.

12. The system of claim 11, wherein the processor is further programmed to perform repeating the method until each package name of the signatures has been selected.

13. Computer-readable hardware with program code stored thereon, wherein the program code instructs a hardware processor to perform:

receiving certificates from an application programming interface (API);

creating signatures for the API based on the received certificates from the API;

creating a property file including the signatures for the API;

identifying, in an application under test, a package associated with the API;

identifying, from the signatures included in the property file, a package name of the package identified package associated with the API;

creating, using reflection during testing of the application under test, a request object for the identified package using the package name and further using data from a response from a previous request to the API to populate a value of a variable of the request object;

invoking, during testing of the application under test, the API using the request object;

identifying a response type of the API from the signatures;

creating, using reflection during testing of the application under test, an expected response object for the identified package using the response type, the package name, a response name, and parameter names from the signature associated with the identified package, wherein the expected response object includes an expected response;

receiving an API response object from the API;

comparing the API response object from the API to the expected response to determine whether the API response object from the API is correct; and issuing an error response if the API response object from the API is not correct.

14. The computer-readable hardware of claim 13, wherein creating, using reflection during testing of the application under test, a request object for the identified package using the package name further comprises using the package name, a method name, and parameter names from the signature associated with the identified package to dynamically create the request object.

\* \* \* \* \*